United States Patent [19]

Tamaki

[11] Patent Number: 4,634,386

[45] Date of Patent: Jan. 6, 1987

[54] AUDIO-VISUAL TEACHING APPARATUS
[75] Inventor: Isao Tamaki, Kawasaki, Japan
[73] Assignee: Sony Corporation, Tokyo, Japan
[21] Appl. No.: 298,608
[22] Filed: Sep. 2, 1981
[30] Foreign Application Priority Data Sep. 5, 1980 [JP] Japan ................................ 55-123345

[51] Int. Cl.⁴ ........................... G09B 7/04; G09B 7/08
[52] U.S. Cl. .................................... 434/323; 360/72.2
[58] Field of Search ............... 273/DIG. 28; 434/323, 434/307, 308–310, 314–316, 319–321; 360/72.2, 33; 371/69

[56] References Cited

U.S. PATENT DOCUMENTS

| | | | |
|---|---|---|---|
| 3,804,993 | 4/1974 | Honnold et al. | 360/72.2 |
| 3,842,399 | 10/1975 | Knever et al. | 371/69 |
| 3,973,244 | 8/1976 | Lovercheck et al. | 364/200 |
| 3,987,484 | 10/1976 | Bosche et al. | |
| 3,996,671 | 12/1976 | Foster | 434/323 |
| 4,055,907 | 11/1977 | Henson | 434/308 |
| 4,165,159 | 8/1979 | Landau et al. | 434/316 |
| 4,190,967 | 3/1980 | Ruegg et al. | 434/308 |
| 4,224,644 | 9/1980 | Lewis et al. | |
| 4,302,785 | 11/1981 | Mussatt | 360/72.1 |
| 4,321,635 | 3/1982 | Tsuyuguchi | 360/72.2 |

Primary Examiner—Richard C. Pinkham
Assistant Examiner—MaryAnn Stoll Lastova
Attorney, Agent, or Firm—Lewis H. Eslinger; Alvin Sinderbrand

[57] ABSTRACT

An interactive audio-visual teaching apparatus includes a video tape player, a video monitor, a student keyboard, a printer, and a programmed teaching controller, which can include a microprocessor. Teaching programs recorded on video tape include a plurality of lesson segments. A program control information code group is contained within the audio track of the tape in advance of the first program and indicates the position of the top of each program and the end of the last program. Segment control information code groups, recorded in the audio track respectively at the onset of each program, contain segment location data, correct answer data, branch instruction data, and the like for the segments of the respective program. A temporary memory, e.g., a RAM, is provided with the program and segment data, and a permanent memory, e.g., a ROM, contains universal software which is used with any previously prepared teaching-program tapes. The teaching controller provides mode control signals to the video tape player, as governed by the contents of the control information code groups in dependence on control pulses picked up from the control track of the tape.

15 Claims, 17 Drawing Figures

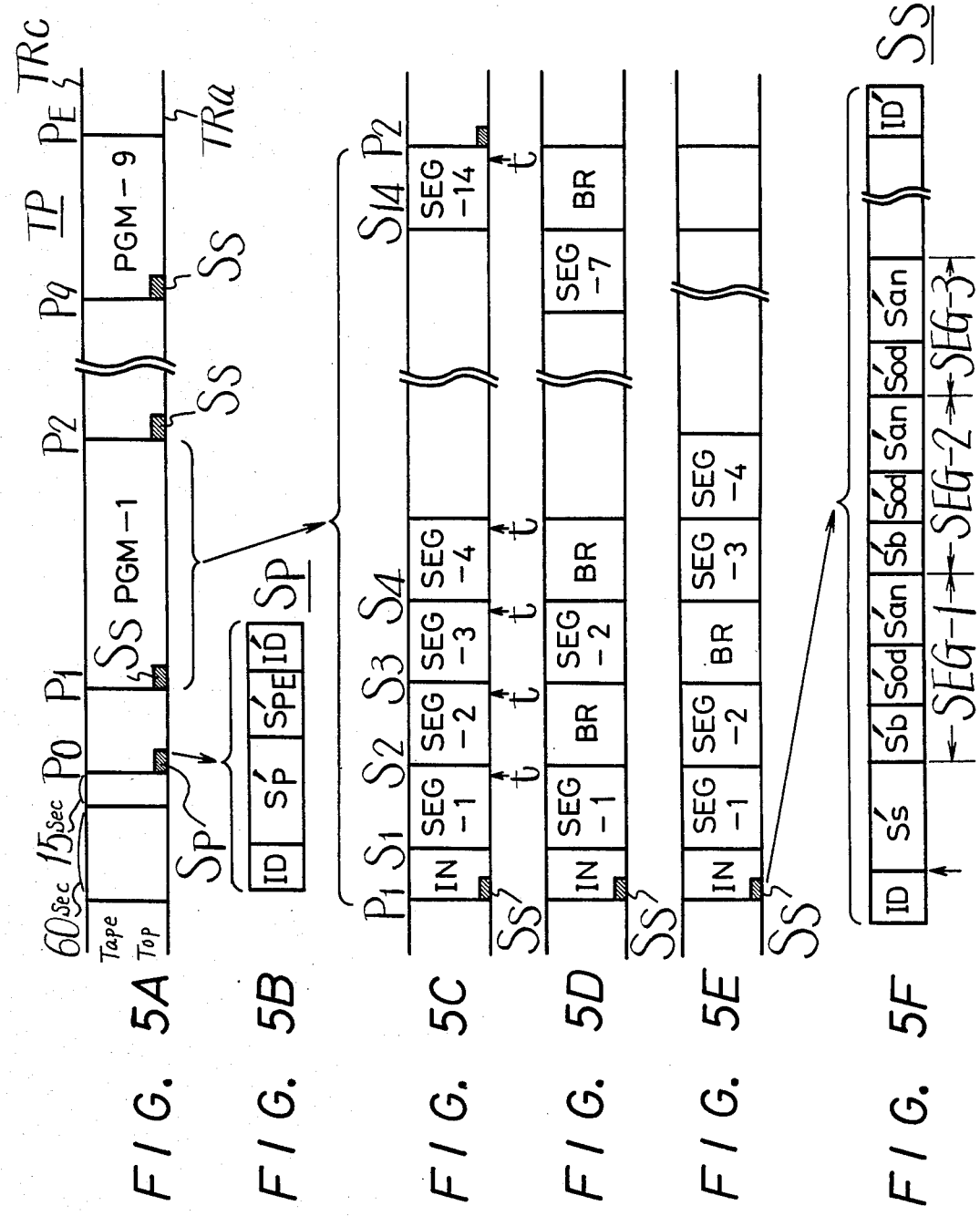

FIG. 8A

<u>DISP-1</u>   INSERT TAPE

<u>DISP-2</u>   STANDBY

<u>DISP-3</u>   SELECT PGM

<u>DISP-4</u>   PGM-1  SEARCH

<u>DISP-5</u>   ENTER ANSWER
PGM-1 SEG-1 QUESTION-1
OR PUSH 'GO' TO REVIEW

<u>DISP-6</u>   ANSWER : 3 5 8
CORRECT !
SEG-2  FOLLOWS

<u>DISP-7</u>   ANSWER : 3 5 8
CORRECT !
ANSWER  QUESTION-2

<u>DISP-8</u>   ANSWER : 3 5 7 9 1 4 2 8 6
INCORRECT↑  ↑ ↑     ↑ ↑
TRY AGAIN
OR PUSH 'GO' TO REVIEW

DISP-9   ANSWER : 3 5 7 9 1 6
         INCORRECT TOO MANY ENTRIES
         TRY AGAIN
         OR PUSH 'GO' FOR CLUE

DISP-10  ANSWER : 3 5 7 9
         INCORRECT TOO FEW ENTRIES
         TRY AGAIN
         OR PUSH 'GO' TO REVIEW

DISP-11  ANSWER : 3 5 6 7 9
         INCORRECT ↑      ↑
         STANDBY TO REVIEW

DISP-12  ANSWER : 3 5 6 7 9
         CORRECT !
         PGM-1 END SCORE 10 OF 14
         SELECT NEW PGM

DISP-13  EJECT TAPE

DISP-14  NO PGM

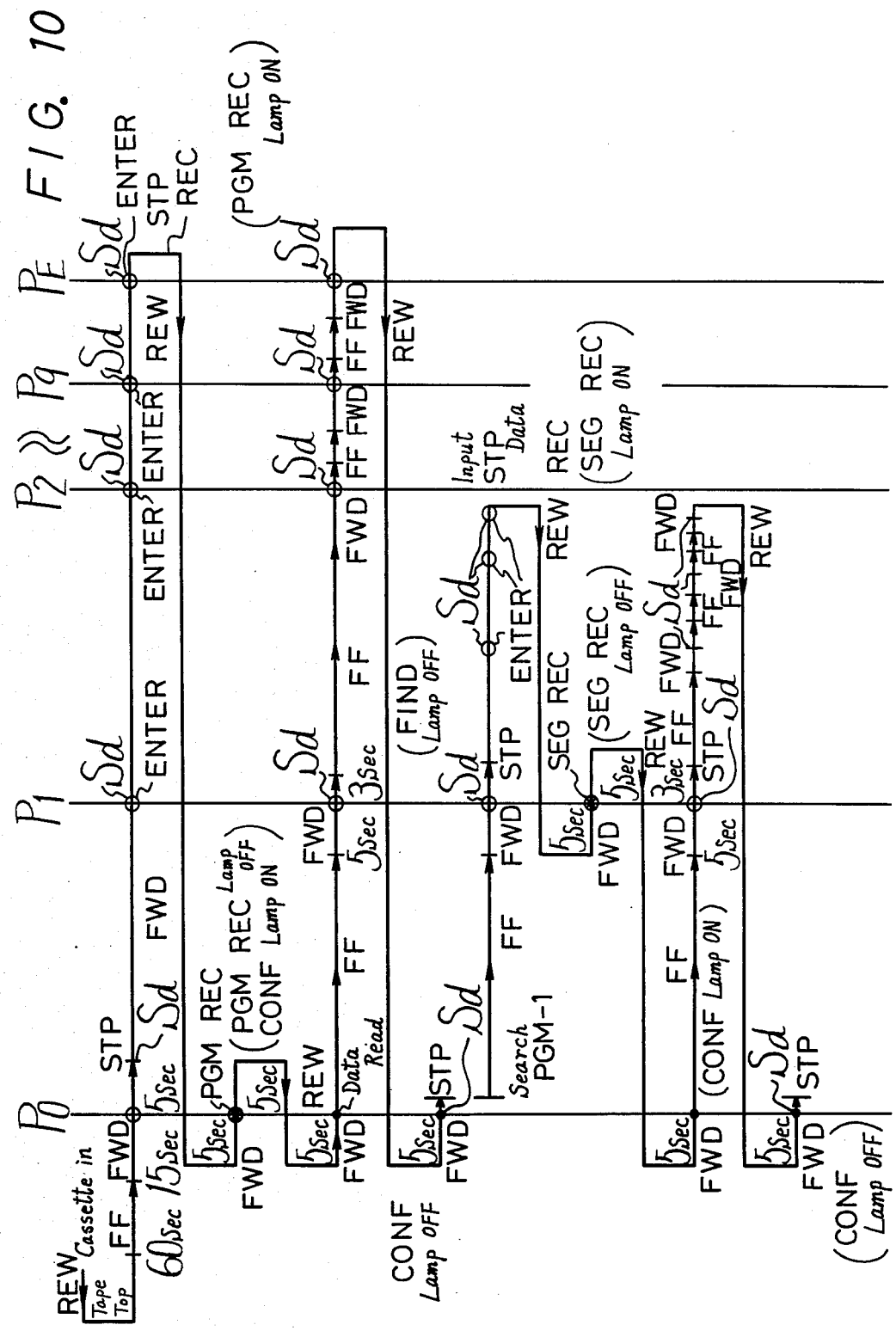

AUDIO-VISUAL TEACHING APPARATUS

BACKGROUND OF THE INVENTION

1. Field of the Invention

This invention relates to audio-visual teaching systems, and more specifically to such systems utilizing a video tape recorder or other device from which an audio-visual program can be presented on a video display device. More particularly, this invention is directed to a teaching system in which a programmed controller, e.g., a microprocessor, controls the presentation of the audio visual teaching program by controlling operation of the video recorder, and scores a student's responses to questions answered at the end of segments of the teaching program.

2. Description of the Prior Art

Video reproducing devices, including video tape players and video disc players, have found an expansive range of uses in the educational field, in addition to their well-known uses in the broadcast and industrial fields and in the home.

More particularly, there have been proposed interactive teaching systems in which a video tape player and a video monitor or receiver present an audio-visual lesson program to a student, and the student responds to questions by depressing selected answering buttons on a student keyboard.

Unfortunately, in these interactive systems, individual software must be prepared for each lesson program, and, as is well known, not only is it time consuming to prepare the programming necessary to provide such software, but the resulting software is rarely free of errors. Moreover, new software is required each time the teaching program is altered or new test questions are added.

A further problem with the foregoing interactive systems has been that special address codes must be included in the system software to identify starting and stopping points in the case of video tape, or frame numbers in the case of video disc, at which the teaching program begins and at which it is to be halted for the student to respond to questions.

OBJECTS AND SUMMARY OF THE INVENTION

Accordingly, it is an object of this invention to provide audio-visual teaching apparatus which avoids the problems mentioned above.

It is another object of this invention to provide interactive, microprocessor-controlled audio visual teaching apparatus utilizing a video tape (or disc) player.

It is a further object of this invention to provide audio-visual teaching apparatus in which any of a variety of teaching programs, each recorded on a record medium, can be used, without the need to provide new software for each teaching program.

It is a still further object of this invention to provide audio-visual teaching apparatus in which various sets of questions, for example provided on separate question sheets, can be used with the same teaching program, but without the need to revise the system software when new questions are used.

It is a yet further object of this invention to provide an audio-visual teaching apparatus in which different sets of questions can be used with the same image information.

According to an aspect of this invention, there is provided teaching apparatus of the type employing a video reproducing device, such as a video tape recorder or disc player, in which a video signal, an audio signal, and a control signal recorded on a video record medium are picked up for reproduction of a video teaching program on a video display device, such as a video monitor or a television receiver. A student is presented with questions in predetermined question periods during the program, and the student responds by selecting an answer, for example, by depressing certain keys on a keyboard. The video reproducing device is capable of operation in at least a forward mode and a stop, or pause mode. The apparatus comprises a teaching controller, which can have at its heart a microprocessor including a ROM, a RAM, a CPU, and an I/O interface, to receive the reproduced audio signal and control signal from the video reproducing device and to supply a mode-establishing signal thereto to cause the video reproducing device to pause at predetermined positions of the record medium and following a student response to proceed; a student input panel for supplying to the controller the student response selected at the predetermined positions; and a video generator circuit coupled to the controller for generating a video instruction display, in cooperation with the student-selected responses and presenting such display on the video display device. In the apparatus of this invention, the audio signal recorded on the medium includes at least one control information period in which is contained control information for programming the teaching controller for the particular teaching program. For this purpose the teaching controller is arranged to receive and store the control information and to generate the mode-establishing signal in dependence on the control signal as governed by the control information.

Various other objects, features, and advantages of this invention will become apparent from the ensuing description of a preferred embodiment, when considered in conjunction with the accompanying drawings.

BRIEF DESCRIPTION OF THE DRAWINGS

FIGS. 5A to 5F and 6 are pattern diagrams of signals recorded on the tape;

FIG. 10 is a timing chart used for explaining the operation of the data recording controller shown in FIG. 9.

DETAILED DESCRIPTION OF A PREFERRED EMBODIMENT

Figure 1:
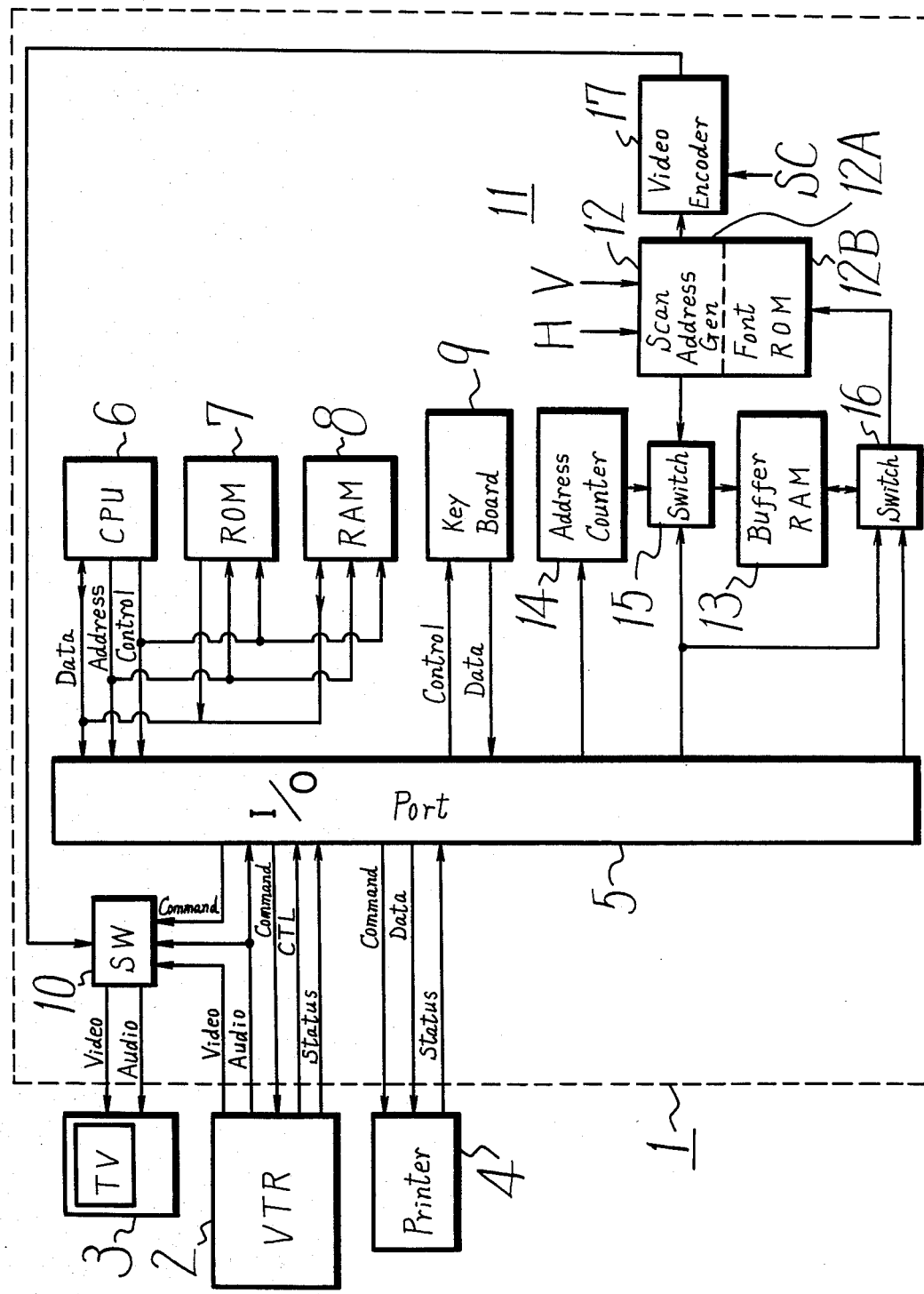
FIG. 1 is a systematic block diagram showing an embodiment of audio-visual teaching apparatus according to the present invention.

With reference to the drawings, and initially to FIG. 1 thereof, a microprocessor-controlled audio-visual teaching apparatus according to this invention includes a teaching controller 1 incorporating a microprocessor, a video tape recorder or VTR 2, a video monitor 3, and a printer 4. The VTR 2 is preferably a cassette tape recorder, although it is also possible to apply the principles of this invention to teaching apparatus utilizing a reel-type recorder or a video disc player. Although a video monitor 3 is used herein, it is also possible to use a television receiver.

The microprocessor of the teaching controller 5 includes an input-output (I/O) port 5, a central processing unit (CPU) 6, a read-only memory (ROM) 7, and a random access memory (RAM) 8, which are joined together by a data bus, an address bus, and a control bus. The ROM 7 contains the system software for controlling the operation of the microprocessor, and the RAM 8 is arranged for temporary data storage, as explained in greater detail later.

The controller 1 further includes a keyboard 9 coupled to the CPU 6 by means of the I/O port 5 and includes numerical keys which a student can actuate in response to questions presented during a lesson program.

The VTR 2 provides video and audio signals through an analog switch 10 to the video monitor 3, and also supplies the audio signal, a mode status signal, and a control signal CTL to the I/O port 5. The I/O port supplies mode control signals to the VTR, and supplies a switching signal to the analog switch 10.

The I/O port 5 also supplies print command and print data signals to the printer 4 and receives therefrom a status signal.

The apparatus also includes a character generating circuit 11 controlled by the microprocessor to supply instruction displays for the student, in the form of a composite color video signal, to an input of the analog switch 10.

The character generator circuit 11 includes a scan-and-font generator 12, a buffer RAM 13 for controlling the scan-and-font generator 12, a write-address counter 14 for receiving a read-write control signal from the I/O port 5, and a pair of switch circuits 15 and 16, each coupled to the I/O port 5 and to the scan-and-font generator 12. The scan-and-font generator 12, which is preferably formed as a large-scale integrated circuit (LSI), is formed generally in two parts: a scan-address generator 12A and a character font generating ROM 12B. As is well known, the scan-address generator 12A is supplied with external horizontal and vertical synchronizing signals H and V obtained, for example, from circuitry in the VTR 2, and the generator 12A provides character information in the form of the usual Y, R-Y, and B-Y video signals. The switch circuit 15 is interposed between the write address counter 14 and the character buffer RAM 13, and upon instruction from the I/O port 5, furnishes write address information to the RAM 13. Upon the occurrence of the read mode of the read-write control signal, data stored in the buffer RAM 13 are supplied through the switch circuit 16 to the character font generating ROM 12B as address data, with the result that a video signal is supplied from an output of the scan-address generator 12A.

A video encoder 17 is coupled to the output of the scan address generator 12A to receive the Y, R-Y, and B-Y signals therefrom. The encoder 17 is also supplied with a 3.58 MHz color subcarrier SC, and thereby supplies an NTSC composite color video signal to the analog switch 10.

By operation of the above-described character generating circuit 11 and video encoder 17, information, in the form of lines of characters (i.e., words, letters, and numbers), can be placed on the viewing screen of the video monitor 3 based on character data supplied from the I/O port 5 of the microprocessor.

Figure 2:
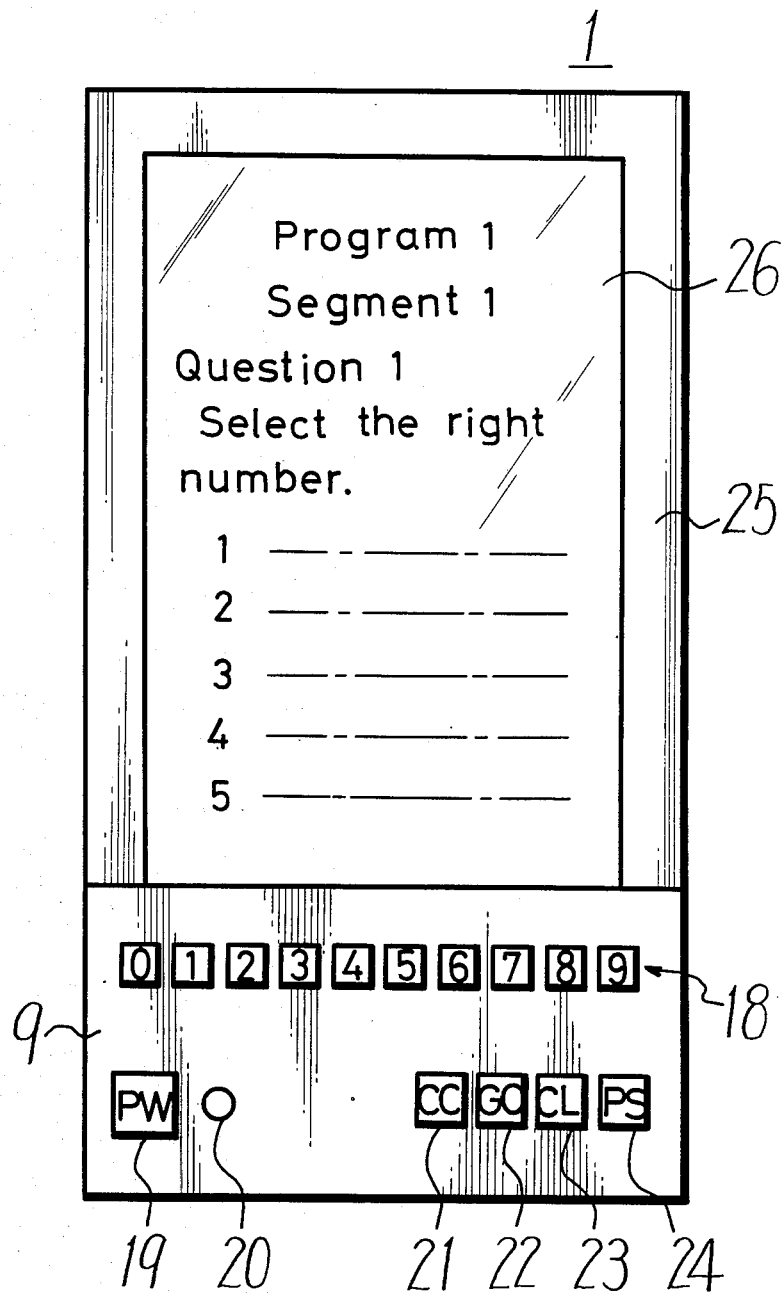
FIG. 2 is a plan view showing a student keyboard panel used in the apparatus shown in FIG. 1.

FIG. 2 shows the general appearance of the exterior of the teaching controller 1, including the keyboard 9. As shown thereon, a numerical key group 18 includes a set of ten depressable keys or push buttons, here numbered "0" through "9". A power-on switch 19 and its associated pilot light 20 (which can be an LED) are also disposed on the keyboard 9, as are a CANCEL key 21, a GO key 22, a CLEAR key 23, and a PAUSE key 24.

A text table 25 is located adjacent to the keyboard 9 and holds a printed question sheet 26. The question sheet contains a battery of printed questions or problems related to the subject matter of the teaching program recorded on the tape. In this embodiment, the questions are of the multiple-choice, single-correct answer variety.

The subject matter, and the associated questions, can, of course, relate to any particular subject, such as biology or electronics, and can be suitably applied to the teaching of a foreign language, such as Japanese. The subject matter could as easily be related to commercial use, such as in the familiarization of salesmen with a company's new products.

It is also possible that the problems can be presented on the screen of the video monitor 3, rather than on the separate printed problem sheet 26.

In this example, five questions, numbered "1" through "5" are presented, and the teaching apparatus will receive and score up to five answers.

Figure 3:
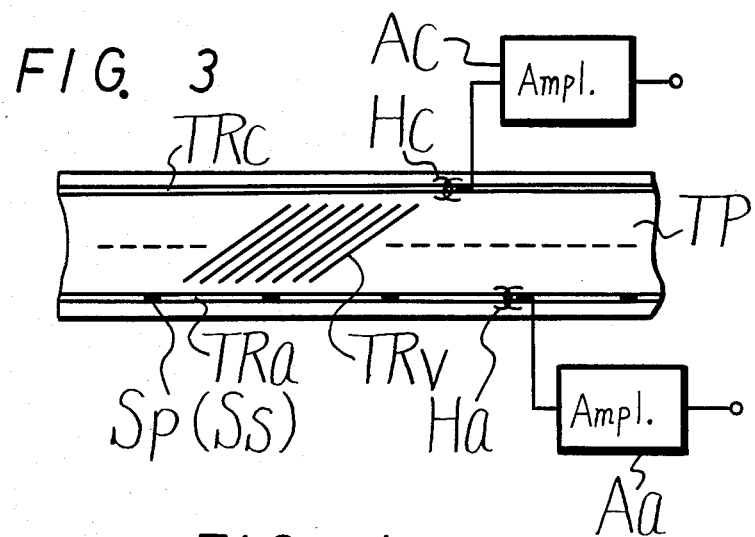
FIG. 3 shows the format of a record pattern of a video tape.

FIG. 3 illustrates the pattern of recored signals on a portion of a cassette-type magnetic video tape TP, as used with the present embodiment. As is conventional, the video signal is contained in skew video tracks $TR_v$, a control signal, in the form of regularly-spaced pulses CTL, is recorded in a longitudinal control track $TR_c$, and the audio signal accompanying the video signal is recorded in a longitudinal audio track $TR_a$.

Fixed magnetic heads $H_c$ and $H_a$ are disposed to contact the tracks $TR_c$ and $TR_a$ for picking up the control signal CTL and the audio signal, respectively. Amplifiers $A_c$ and $A_a$ are respectively connected to the fixed magnetic heads $H_c$ and $H_a$.

The audio signal contained in the audio track $TR_a$ also includes a program information code group $S_P$ and one or more segment information code groups $S_S$. These code groups $S_P$ and $S_S$ occur as bursts of digital information lasting a few seconds, and will be described in greater detail later. While the information code groups $S_P$ and $S_S$ are here contained on the audio track $TR_a$, it would be possible according to this invention to record such code groups along the control track $TR_c$.

Figure 4:
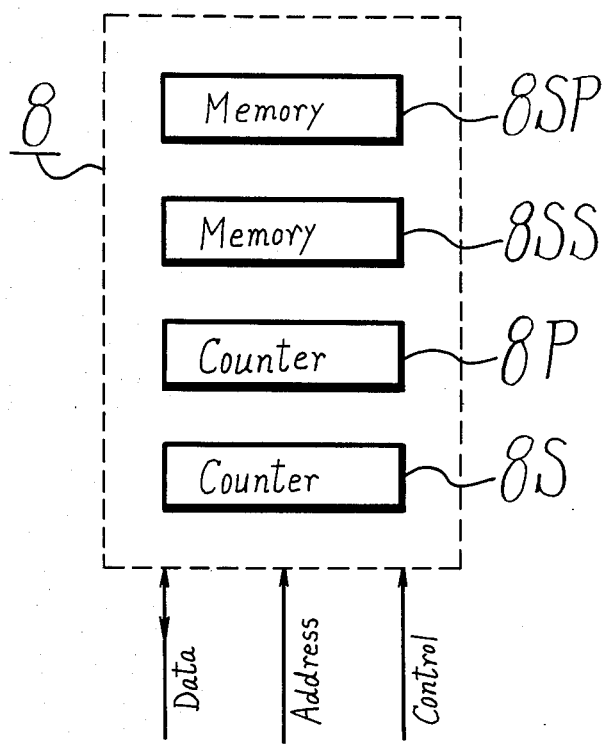
FIG. 4 is a block diagram showing a portion of the circuit of the teaching apparatus shown in FIG. 1.

FIG. 4 illustrates schematically the functional construction of the RAM 8, as controlled by the system software contained in the ROM 7. The RAM 8 is effectively partitioned into a program memory 8SP, a segment memory 8SS, a program address counter 8P, and a segment address counter 8S. The program memory 8SP stores program address data contained in the program information code group $S_P$, and the segment memory 8SS stores segment address data, as well as correct-answer data and other related data, contained in the segment control information code groups $S_S$. The program address counter 8P and the segment address counter 8S count the control pulses contained in the control signal CTL to keep track of the length of tape advancement of the magnetic cassette tape TP within a particular program or segment thereof.

FIGS. 5A to 5F illustrate generally the structure of the teaching programs and associated program control information code group $S_P$ and segment control information control groups $S_S$ recorded on the tape TP. As shown in FIG. 5A, a tape leader portion is formed corresponding to approximately 60 seconds of tape at normal play speed, followed by another 15 second interval of tape at the normal play speed. The program control information code group $S_P$ is disposed on the tape at a position $P_O$ immediately following the leader portion, and marks the onset of a brief, general introductory audio-visual section, here identifying the programs to follow. A first teaching program PGM-1 begins at a point $P_1$ at which occurs the associated segment control information code group $S_S$. After the teaching program PGM-1, a second, successive teaching program PGM-2 begins at a point $P_2$ at which occurs the associated segment control information code group $S_S$. In this embodiment, there are nine teaching programs recorded on the tape TP, and the last thereof PGM-9 begins at a point $P_9$ and ends at an end point $P_E$.

The detail of the program control information code group $S_P$ is shown in FIG. 5B. The code group $S_P$ is formed of an identification code ID, program top address data $S_P'$, program and address data $S'_{PE}$, and an end identification code ID'. The identification codes ID and ID' serve to distinguish the code group $S_P$ from the remaining audio signal, so that the microprocessor will be conditioned to receive the data $S_P'$ and $S_{PE}'$ contained in the code group, but will not be influenced by noise which might be contained in the remaining audio signal. The identification codes ID and ID' can also be used to mute the audio of the monitor 3 during the period that the code group $S_P$ is present.

FIG. 5C shows generally the format of a single teaching program PGM-1. In this embodiment, each program can contain up to fourteen lesson segments SEG-1 to SEG-14. The point $P_1$ marking the top of the program PGM-1 is followed by a short introductory audio-visual portion IN. The top of the successive lesson segments SEG-1, SEG-2, ... SEG-14 occur at points $S_1$, $S_2$, $S_3$, ... $S_{14}$, and the end of the last segment SEG-14 occurs at the point $P_2$ marking the top of the next program PGM-2.

Each segment SEG-1 to SEG-14 includes an audio visual lecture on a selected subject, for example, on Japanese language.

At or near the end of the lecture portion, a short exam or testing period t occurs, and the student responds to the questions on the sheet 26 during such periods t.

It is possible to insert a branch instruction BR, or short review lecture, following each testing period t in each segment, as illustrated in FIG. 5D, or in only selected segments, as illustrated in FIG. 5E. Such branch instruction BR can contain clues directed to the tested subject matter. Thus, the branch instruction BR can favorably be presented when a student misses too many questions, but can be skipped over if the student has no particular problems with the respective segment.

FIG. 5F shows the detail of the content of the segment control information code group $S_S$ contained at the top of the program PGM-1.

As illustrated in FIG. 5F, the code group $S_S$ contains an opening identification code ID, segment address data $S_S'$, and for each respective segment SEG-1 to SEG-14, a branch flag $S_b'$, an answer order flag $S_{o'd}$, and correct answer data $S_{a'n}$. The code group $S_S$ ends in a closing identification code ID'. As with the above-described program control information code group $S_P$, the opening identification code ID and the closing identification code ID' of the segment control information code group $S_S$ can be used to mute the audio of the video monitor 3 during the occurrence of the code group $S_S$.

Figure 6:
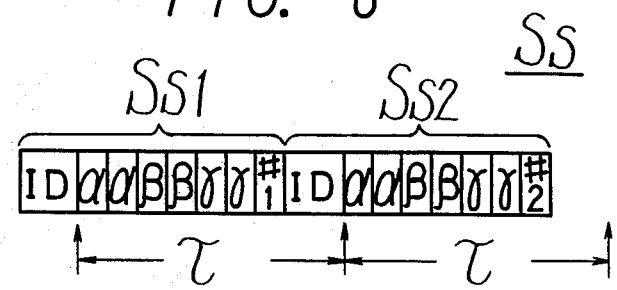

The segment control information code group $S_S$ can be adapted as shown in FIG. 6 for the protection from errors which can occur in the recorded signal. For that purpose, in this embodiment, the control group $S_S$ is formed as a first section $S_{S1}$ and a second section $S_{S2}$. Each of these section $S_{S1}$ and $S_{S2}$ are substantially identical and contain essentially the information as described with reference to FIG. 5F. Each section $S_{S1}$ and $S_{S2}$ contains a segment identification code ID and a respective muting release flag #1 and #2 for releasing the muting of the audio. In each of the sections $S_{S1}$ and $S_{S2}$, the items of data are redundantly recorded. That is, the data in each section is repeated every four to eight bits, e.g., $\alpha$, $\alpha$; $\beta$, $\beta$; and $\gamma$, $\gamma$. When the code group $S_S$ occurs, the data $\alpha$, $\alpha$; $\beta$, $\beta$; $\gamma$, $\gamma$ are compared with one another to determine whether an error has occurred. If no error is detected, the section $S_{S1}$ of the segment control information code group $S_S$ is recorded, and the section $S_{S2}$ is disregarded. However, if errors are detected in the first section $S_{S1}$, the segment address data $S_{S2}$, and the associated identification code ID are read into the segment memory 8SS of the RAM 8 and the segment address counter 8S is reset to zero when such identification code ID occurs.

Generally, when the reproduced program and segment control information code groups $S_P$ and $S_S$ are picked up by the audio fixed head $H_a$ the contents thereof are respectively stored in the program memory 8SP and the segment memory 8SS. Upon the occurrence of the identification code ID of the program control information code group SP and the segment control information code group $S_S$, the program address counter 8P and the segment address counter 8S are respectively set to zero, and the counters 8P and 8S begin counting the pulses of the control signal CTL at the point of occurrence of the identification code ID. The program address counter 8P and the segment address counter 8S count up or count down, depending on the direction of advancement of the tape TP, under the control of the CPU 6 as directed by the system software stored in the ROM 7.

As described above, the program memory 8SP stores the program address data $S'_P$ and the segment memory 8SS can store the segment address data $S'_S$ and the associated flags of the segment control information code group $S_S$.

As the program PCM-1 commences, the contents of the respective counters 8P and 8S are compared with the program address data $S'_P$ and the segment address data $S'_S$ in the RAM 8 by means of circuitry contained in the CPU 6. As a result of this comparison, the address positions $P_0$, $P_1$, $S_1$, $S_2$, ... $S_{14}$ can be accurately determined so that the teaching programs PGM-1 to PGM-9 and the segments SEG-1 to SEG-14 contained therein can be accurately begun and ended by the teaching controller 1.

The segment address counter 8S is reset at the end of the identification code ID of the segment control information code group $S_S$ each time that the identification code ID is fed to the counter 8S. That is, the contents of the counter 8S are made zero upon each occurrence of the identification code ID.

When the identification code ID of the segment control information code group $S_S$ is applied to the program address counter 8P, the program address data $S'_P$ for the associated program is preset into the program address counter 8P. Thus, even if the control signal CTL, which is supplied to the program address counter 8P, suffers drop-out in the VTR 2, the content of the program address counter 8P is corrected as soon as a new teaching program PGM-1 to PGM-9 is commenced.

As aforesaid, if no error is detected in the first section $S_{S1}$ of the segment control information code group $S_S$, the identification code ID associated therewith is used to reset the segment address counter 8S, and the identification code ID of the second section $S_{S2}$ is disregarded. However, if an error is detected in the first section $S_{S1}$, the identification code ID associated with the second section $S_{S2}$ is used to reset the address counter 8S. At that time, the program address counter 8P is preset to the program address data $S_P'$.

When the program and segment address counters 8P and 8S are respectively preset and reset at the end of the identification code ID associated with the second section $S_{S1}$, the contents thereof are reduced by the number of control pulses corresponding to the duration $\tau$ (for example, three seconds) that each of the sections $S_{S1}$ and $S_{S2}$ is present. Therefore, at the time following the arrival of the section flag #2, and after the end of the identification code ID of the second section $S_{S2}$, the following correction process is carried out. The content of the segment address counter 8S is added to that of the program address counter 8P. At the same time, the count content of the segment address counter 8S is multiplied by two. Following this, the count content of both the counters 8P and 8S are correct. This result will be valid because the duration time $\tau$ of the segment $S_{S2}$ is, perforce, sufficiently longer than the length of the identification code ID.

Figure 7A:
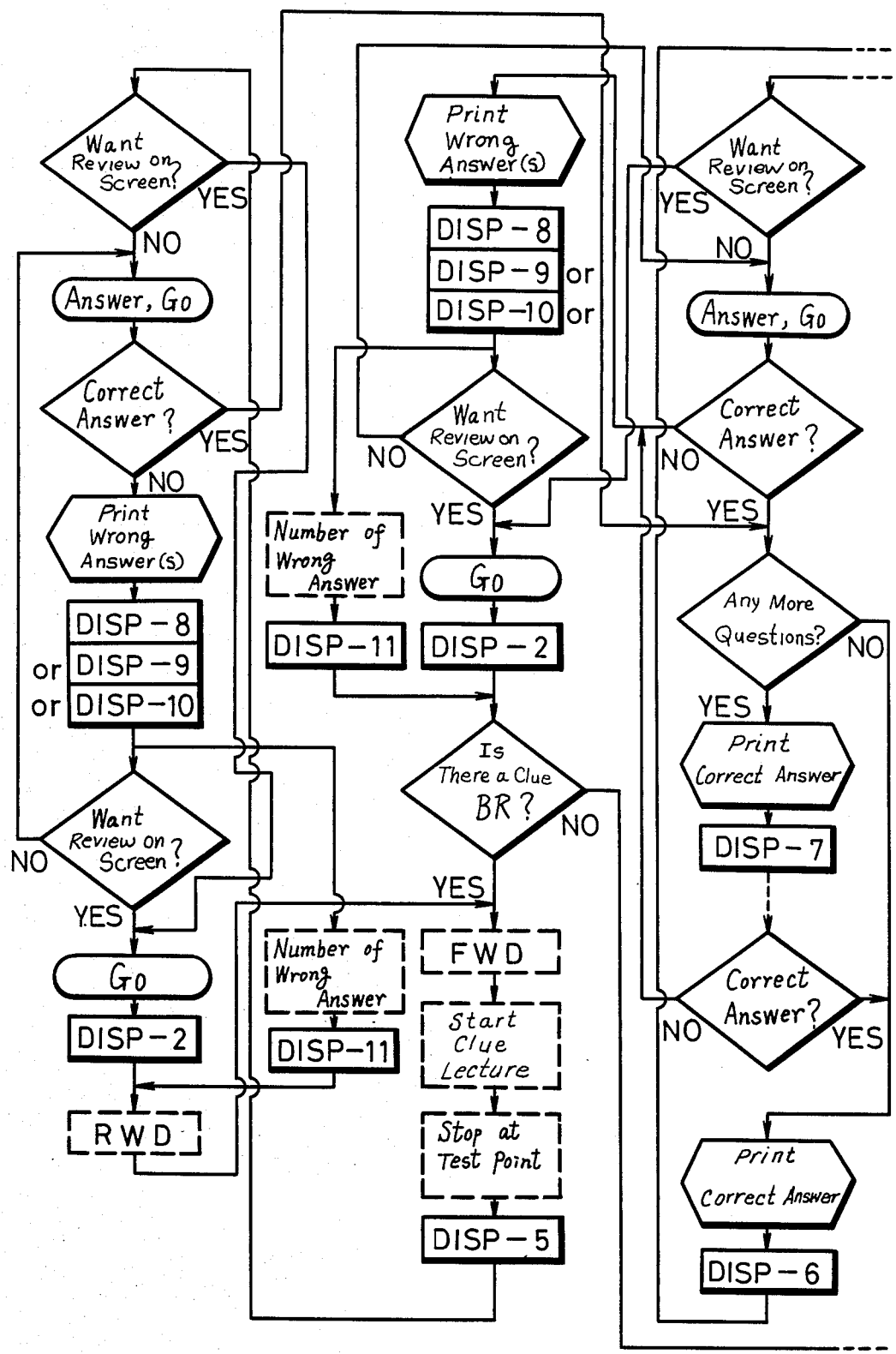
FIG. 7 (which is formed of FIGS. 7A and 7B) is a flow chart used to explain the operation of the learning system shown in FIG. 1.
Figure 7B:
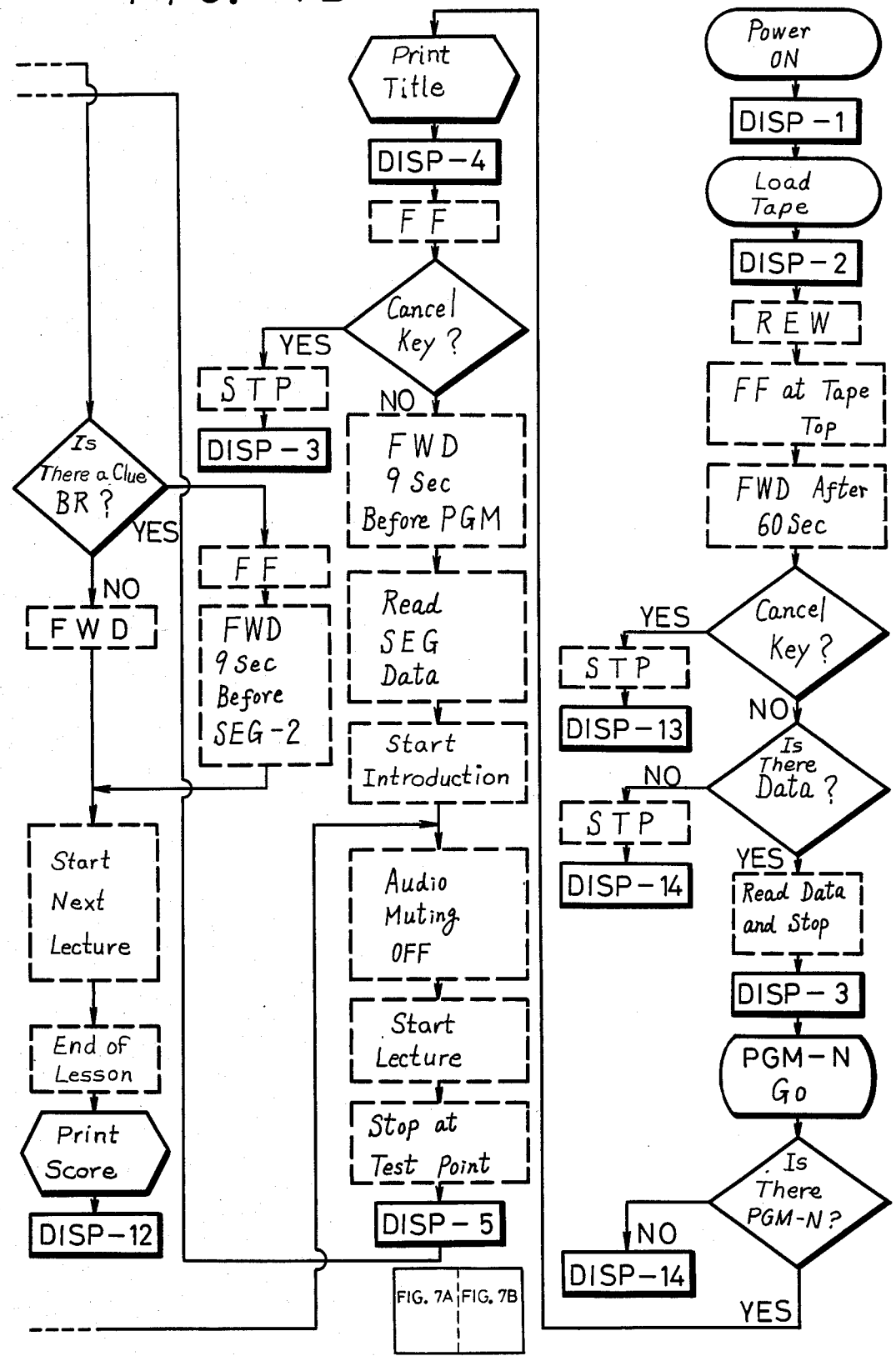

The flow chart of FIG. 7 illustrates the operation of the above-described teaching system. In the flow chart of FIG. 7 (formed by associating FIGS. 7A and 7B), the shapes of the various blocks are used to identify the following operations:

⬭ : identifies the operation of the teaching controller 1 and the VTR 2 by a student;

▭ : indicates the index of the contents displayed on the viewing screen of the monitor 3, as shown in FIG. 8;

⌐ ⌐ : indicates an operation step of the teaching apparatus;

◇ : indicates an identification or discrimination step; and

⬠ : indicates a print operation by the printer 4.

Further, in FIG. 7, the reference characters PGM-N represent the sequence number of the nth teaching program, and the number of permissible incorrect answers is, for example, three.

Figure 8B:
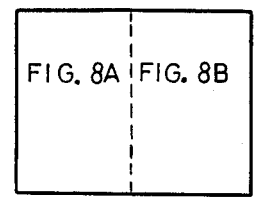
FIG. 8 (which is formed of FIGS. 8A and 8B) is a chart of various displays presented on the picture screen of a video monitor or television receiver used with the teaching apparatus shown in FIG. 1.

The contents to be displayed on the viewing screen of the video monitor 3 in response to the commands DISP-1 through DISP-14, at the respective blocks in FIG. 7, are shown in FIG. 8 (formed by associating FIGS. 8A and 8B). The abbreviations FWD, STP, and REW represent the VTR operational modes of normal forward, fast forward, stop, and rewind, respectively.

The flow chart of FIG. 7 is believed to be straightforward and self-explanatory and will be discussed only generally herein. The operation begins with powering on, and the flow chart begins at the upper right-hand corner. The rightmost column explains the loading of the tape cassette to the selection of a teaching program. Then, at the next column leftward, the title of the selected program is printed, the tape is brought up to the point $P_N$ corresponding to the beginning of the program, and the associated segment data are read into the segment memory 8SS. Then, the first segment is played, and at the test or question point t, the tape is stopped and the student is instructed to answer the questions on the question sheet.

Thereafter (e.g., at the rightmost column of FIG. 7A) the student is presented with the option of answering the questions directly (Answer, GO) or of first viewing a review of the material (GO). If a clue branch BR is included in the segment, the clue lecture is presented. Then (at the left most column) the student answers the questions (Answer, GO) or requests a review (GO). In the latter case, the tape is rewound, and the clue branch BR is again presented.

If the student answers the questions (Answer, GO), as shown in the rightmost column of FIG. 7A, he or she is informed whether the answers are correct or not, and if correct, each correct answer is printed out. At the end of the question period, the tape is advanced beyond any clue branch BR (leftmost column of FIG. 7B) and the next segment lecture is played. At the end of the program, the final score is printed.

If the student answers too many questions incorrectly, as shown in the center column of FIG. 7A, the student is so informed (e.g., DISP-11) and he or she is given an opportunity to review the material by viewing the branch clue BR. Following that, the student answers the questions again, and the tape is advanced to the next segment.

A corresponding recording data controller for preparing the tape TP will now be described with reference to FIGS. 9 and 10. The recording data controller records the above-mentioned program and segment control information code groups $S_P$ and $S_S$ upon the tape TP on which the video and audio have been previously recorded. The inner workings of the data recording controller are essentially the same as the teaching controller 1 described hereinabove, and a detailed explanation of the circuitry thereof is unnecessary. Nevertheless, the somewhat different function of the recording controller requires a modified keyboard or control panel as shown in FIG. 9.

Figure 9:
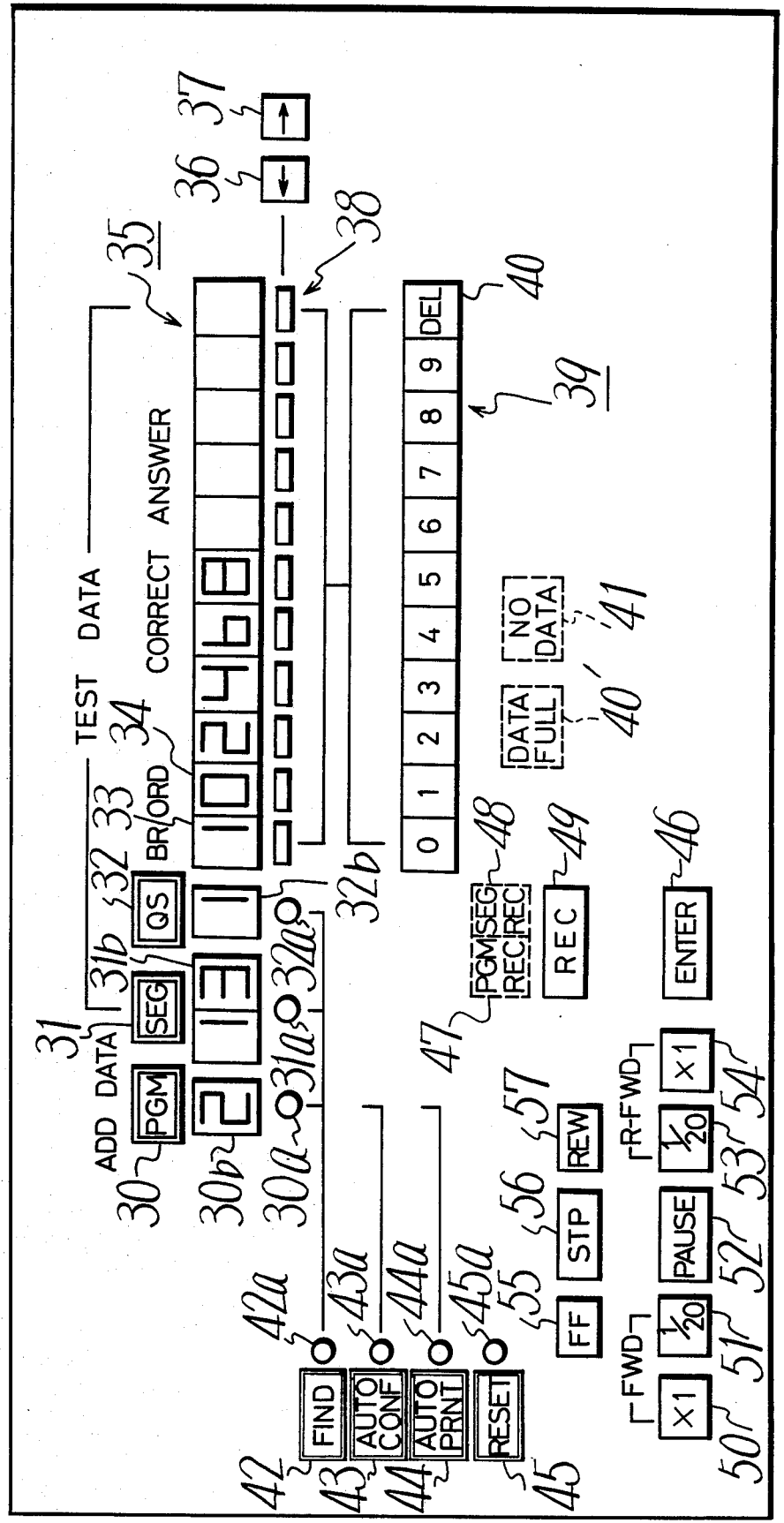
FIG. 9 is a plan view showing an example of a data recording controller.

As shown in FIG. 9, the control panel of the recording data controller includes a program address setting button 30, together with its associate pilot lamp 30a and address display 30b; a segment address setting button 31, together with its associated pilot lamp 31a and address display 31b; and a question or problem number setting number key 32, together with its associated pilot lamp 32a and problem number display 32b. A data display 33 indicates whether or not there is a branch BR, and another data display 34 indicates whether or not there is an order in the answers. A correct-order answer display having a length of nine places indicates the correct answers for up to nine questions. Backward and forward operating buttons 36 and 37, respectively, control which of the displays 33, 34, and 35, and their associated operations, are selected, and a pilot lamp array 38 indicates which of the displays 33, 34, 35 and the associated function, has been selected.

An operating panel 39 includes ten operating buttons "0" through "9". The buttons of the panel 39 are used to enter data concerning, for example, whether or not there is a branch instruction, and whether or not there is an order to the answers, and are also used to enter the respective correct answers. The setting of the eleven items of data corresponding to the data displays 33, 34, and 35 are carried out one at a time by means of the backward and forward operating buttons 36 and 37 and the operating buttons of the panel 39. A release button 40 is used if it is desired to change the branch data, the order of the answers, or any of the answers to the questions displayed on the data displays 33, 34 or 35.

A data-full display 40' and a data-empty display 41 are included on the recording controller.

An address and number position detecting operation button 42 and its associated pilot light 42a, an auto-confidence operation button 43 and its associated pilot light 43a, an auto-printing operation button 44 and its associated pilot light 44a, and a reset operation button 45 and its associated pilot light 45a are arranged together at one side of the controller.

A write-in operation button 46 causes the RAM 8 of the controller to store the count content of the program and segment address counters 8S and 8P, respectively.

Program and segment address displays 47 and 48 show the address in the counters 8P and 8S, respectively. A tape record operation button 49 is used to set the VTR 2 into a record mode.

Operating buttons 50-54 are used to establish forward, or normal speed mode of the VTR 2, a 1/20 speed forward mode, a pause mode, a 1/20 speed reverse mode, and a normal reverse mode, respectively. A fast-forward button 55, a stop button 56, and a rewind button 57 are used to establish the fast-forward, stop, and rewind modes of the VTR 2.

The operation of the controller of FIG. 9 in recording the program and test data, including the program control information code group $S_P$ and the segment control information code groups $S_S$, onto the tape TP can be explained by means of the diagram of FIG. 10. In that view, a circle ○ indicates data entered into the memory 8SS or 8SP; a circle with a diagonal cross ⊗ indicates the recording of a program or segment control information code $S_P$ or $S_S$ on the tape TP; and a solid dot ● indicates that the program addresses determined from the audio track $TR_a$ of the tape TP are entered into the RAM 8.

Initially, a video tape cassette is loaded into the VTR 2, and is rewound to the very beginning, then fast-forwarded to a position corresponding to sixty seconds of normal playing time. Thereafter, the tape is transported to its normal speed for approximately fifteen seconds, and this point is considered the top of the tape, and is used as the reference address point $P_0$. At this position of the tape TP, the program address counter 8P of the RAM 8 is reset so that the content thereof is made zero. Thereafter, the pulses of the control signal CTL reproduced from the tape are counted. The tape is advanced from the point $P_0$, and five seconds thereafter the tape is stopped and at the alarm sound Sd is generated. Following this, the tape is again transported at the normal speed. An instructor, while watching the display screen of the video monitor 3 and listening to the sound therefrom, depresses the operating button 46 at a selected position $P_1$ corresponding to the beginning of the first teaching program. By that operation, the contents of the program address counter 8P are stored in the program address memory 8SP of the RAM 8. Likewise, the program addresses $P_2$ to $P_9$ and $P_E$ are stored in the program address memory 8SP and the alarm sound $S_d$ is produced at the respective addresses. Following the end of program $P_E$, the tape TP is stopped.

At that time, the recording operation button 49 is actuated. This lights the program address record display 47, and the tape TP is automatically rewound to a point five seconds in advance of the point corresponding to the program address $P_0$. Then, the tape is advanced at normal speed, and, after five seconds, the program control information code group $S_P$ including the program address data $S'_P$ representing the addresses $P_1$ to $P_9$ and $P_E$ are recorded on the tape TP at the position of the reference address $P_0$.

Approximately five seconds from the time that the tape TP passes through the reference address $P_0$, the auto-confidence pilot lamp 43a is lit, and the program display 47 is extinguished. Also at that time, the tape TP is rewound to the top. After the tape is approximately five seconds in advance of the reference program address $P_0$ the tape is again advanced at normal speed and the program address data $S'_P$ are reproduced from the tape at the reference program address $P_0$, and are consequently written into the program memory 8SP of the RAM 8. Thereafter, the tape is repeatedly transported at fast forward speed until approximately five seconds in advance of the respective addresses $P_1$ to $P_9$, and $P_E$, and is run from each such point at normal speed until approximately three seconds after the respective program addresses. Each time that the contents of thee program address counter 8P, corresponding to the number of counted pulses of the control signal CTL, coincides with the address data of the respective program addresses $P_1$ to $P_9$ and $P_E$, the alarm sound $S_d$ is generated. Accordingly, the correctness of the program addresses can be ascertained by an instructor viewing the picture screen of the video monitor 3 and listening to the sound therefrom. When the tape TP is passed through the final address $P_E$, it is again rewound to the top. When five seconds in advance of the reference address $P_0$, the tape is advanced at its normal speed and is then stopped a brief distance after the reference address $P_0$.

Within each program, the data for the respective segments contained therein are recorded in a similar manner.

When the instructor begins the operation to record the segments for the first program PGM-1, the tape is advanced at fast-forward speed until approximately five seconds in advance of the program address $P_1$, and the tape is then advanced at normal speed. At the address $P_1$, the alarm sound $S_d$ is generated, and the segment address counter 8S of the RAM 8 is reset, so that the content thereof is made zero. Thereafter, the pulses of the control signal CTL are counted as the tape is transported. A few seconds after the tape TP has passed through the program address $P_1$, the tape is stopped, and the detecting pilot lamp 42a is extinguished. Thereafter, the tape is transported at normal speed, and the instructor depresses the operating button 46 at the predetermined positions corresponding to the beginnings of the respective segments, as ascertained while observing the viewing screen of the monitor 3 and listening to the sound therefrom. Consequently, the addresses corresponding to the positions of the respective segments are stored in the segment memory 8SS of the RAM 8 and the alarm sound $S_d$ is generated at those points. When the last of the segments in the program PGM-1 is passed, the segment record display 48 is lit, and the tape is automatically rewound to the top. Approximately five seconds in advance of the program address $P_1$, the tape is advanced at its normal forward speed, and the segment data stored in the RAM 8 is recorded, as part of the segment control information code group $S_S$ at the address $P_1$. Approximately five seconds after the tape has passed through the program address $P_1$, the tape is rewound to a point approximately five seconds in advance of the reference program address $P_0$, following which the tape is advanced at normal speed. When the tape reaches the address $P_0$, it is advanced at fast-forward speed until a point approximately five seconds in advance of the reference address $P_1$, from which it is advanced at normal speed.

When the tape TP reaches the address $P_1$, the segment data contained in the segment control information code group $S_S$ are stored in the second address memory 8SS of the RAM 8, and the confidence pilot lamp 43a is lit. After three seconds from the address $P_1$, the tape is fast-forwarded until slightly in advance of the beginning of the first segment, following which the tape is again transported at normal speed. This operation is repeated for each segment address $S_1$ to $S_{14}$, and the alarm sound $S_d$ is generated each time that the counted content of the segment address counter 8S coincides with the address stored in the RAM 8 as segment address data. Accordingly, the instructor, while observing the viewing screen of the monitor 3 and listening to the sound therefrom, can ascertain the correctness of the segment addresses $S_1$ to $S_{14}$. After the tape has played through the last segment address, the tape is rewound until it has passed through the reference program address $P_0$ to a point approximately five seconds in advance thereof. At that point the auto-confidence pilot lamp 43a is extinguished, and the tape TP is advanced at normal speed. When the tape reaches the reference address $P_0$, the alarm sound $S_d$ is generated, and a few seconds thereafter, the tape is halted.

The segment addresses for the following programs PGM-2 to PGM-9 are also recorded in a similar manner.

With the teaching apparatus of this invention, particularly as described hereinabove, address data for the program and segments thereof, together with correct answer data and branch data, are recorded directly on the video tape itself. Consequently, the running of the video tape is automatically controlled in accordance with address data reproduced from the tape. As a result, various different tapes, each with its own respective address data and command signals recorded thereon, and each consisting of several programs having a plurality of instructional segments, can all be used with the very same teaching apparatus without having to provide special software for any of the tapes.

Furthermore, according to this invention, because the program address data and segment address data are recorded at their respective positions on the video tape itself, the required data memory capacity of the teaching apparatus can be kept at a minimum, thereby keeping the construction thereof simple and the cost low.

Moreover, although the above described embodiment utilizes a video tape, it should be understood that the principles of this invention could readily be applied to a teaching apparatus using a video disc player. In that regard, it should be noted that frame identification data recorded on the video disc could be used to serve the function of the control signal CTL as used in the above-described embodiment.

Although a single illustrative embodiment of this invention has been described in detail hereinabove, it is to be understood that the invention is not limited to that precise embodiment, and that their various changes and modifications can be effected therein by one skilled in the art without departing from the scope or spirit of the invention as defined in the appended claims.

What is claimed is:

1. Teaching apparatus of the type employing a video reproducing device for reproduction of a video teaching program on a video display device, and in which a student is presented with questions to be answered by selecting a response, the video reproducing device being capable of operation in at least a forward mode and a stop mode; the apparatus, comprising:

a video record medium for use with said video reproducing device and having recorded thereon a video signal, an audio signal, and a control signal in respective tracks, said audio signal including program information code groups and segment information code groups in burst form;

controller means coupled to said video reproducing device to receive said audio signal and said control signal therefrom and to supply a mode-establishing signal thereto to cause said video reproducing device to stop at predetermined positions of the record medium and following a student response to proceed, said controller means including permanent memory means containing a system control program and temporary memory means controlled by said system control program and arranged to store program address data, segment address data, and correct response data contained in bursts of program information code groups and segment information code groups;

student input means for supplying to said controller means the student response selected at said predetermined positions; and video generator means coupled to said controller means for generating a video instruction display in cooperation with said student-selected responses and presenting such display on said video display device;

wherein said program information code groups and said segment information code groups in said audio signal recorded on said video record medium include at least one segment of control information recorded at the onset of said video teaching program and containing data for halting and commencing said reproducing device at said predetermined positions which occur later in said video teaching program, and wherein said temporary memory means is arranged for receiving and storing said control information, for use by said control means in generating said mode-establishing signal at the later-occurring predetermined positions in dependence upon said control signal as governed by the control information contained in the stored at least one segment thereof.

2. Teaching apparatus according to claim 1, further comprising analog switch means, disposed between said video reproducing device and said video display device, and having an input coupled to said video generator means and a control terminal coupled to said controller means, for normally providing said recorded video teaching program to said video display device, but providing instead during said predetermined question periods said video instruction display.

3. Teaching apparatus according to claim 2, wherein said analog switch means includes muting means for cutting out said audio signal during said at least one segment of control information.

4. Teaching apparatus according to claim 1, wherein said video generator means includes character generator means for generating display characters as determined by said controller means, and video encoder means coupling said character generator means to said video display means.

5. Teaching apparatus according to claim 4, wherein said character generator means includes a scan address generator coupled to receive horizontal and vertical synchronizing signals produced by said video reproducing device and furnished to said video display device, and a character font read-only memory coupled to said scan address generator, said controller means providing address commands to said character font read-only memory.

6. Teaching apparatus according to claim 1, wherein said system control program stored in said permanent memory means includes universal teaching program data for controlling operation of said video reproducing device and said video generator means in dependence on the content of said control information contained on said video record medium;
    said temporary memory means being arranged to store said control information reproduced from said at least one segment;
    input/output means coupling said controller means with said video reproducing device, said video display device, said student input means, and said video generator means; and
    a central processing unit coupled to said permanent memory means, said temporary memory means, and said input/output means.

7. Teaching apparatus according to claim 6, wherein aid control information is provided as at least one item of program data information indicating the positions of the beginning and end of at least one video teaching program recorded on said video record medium; each such video teaching program being constituted of one or more program segments; and for each such program segment information code group is provided identifying the positions of said program segments; and said temporary memory means includes a program memory for storing said program information code groups and a segment memory for storing said segment information code groups.

8. Teaching apparatus according to claim 7, wherein said temporary memory means further includes a program counter and a segment counter each provided with said control signal for respectively automatically measuring the elapsed duration of an associated video teaching program and one said segment thereof.

9. Teaching apparatus of the type employing a video tape device for reproduction of a video teaching program on a video display device, and in which a student is presented with questions to be answered during predetermined question periods in said video teaching program by selecting a response, the video tape device being capable of operation in at least a forward mode, a stop mode, and a rewind mode; the apparatus comprising:
    a video tape for use with said video tape device on which a video signal is recorded on parallel transverse tracks and on which an audio signal and a control signal are recorded in respective longitudinal tracks, said audio signal containing bursts of program information code groups and segment information code groups;
    controller means coupled to said video tape device to receive said audio signal and said control signal and to supply a mode-establishing signal thereto to cause said video tape device to pause at predetermined positions of said video tape and following a student response to proceed in a forward or rewind mode, said controller means including read only memory means containing a control program and read/write memory means controlled by said control program to be arranged into a program memory for storing program address data contained in said program information code group, and a segment memory for storing segment address data and correct response data contained in said segment information code groups;
    student input means for supplying to said controller means the student response selected at said predetermined positions; and
    video generator means coupled to said controller means for generating a video instruction display in cooperation with said student-selected responses and presenting such display on said video display device;
    wherein one of said longitudinal tracks includes at least one period of control information at the onset of the video teaching program read into said read/write memory means for programming said controller means, with the remainder of the one longitudinal track containing the appropriate one of audio signal and control signals to accompany the video teaching program, and said controller means includes means for generating said mode-establishing signal at predetermined points during said video teaching program in dependence upon said control signal as governed by the stored control information.

10. Teaching apparatus according to claim 9, wherein said longitudinal audio track includes said control information contained in a program data information code group disposed in advance of any teaching program recorded on the tape and a segment data information code group at the beginning of each such teaching program.

11. Teaching apparatus according to claim 10, wherein each said teaching program is constituted by a plurality of lesson segments, and the segment data information code group associated with such teaching program includes segment address data representing the start point of each such segment, answer order flag data representing the predetermined point at which the student is to respond to questions, and correct answer data representing the correct responses to predetermined questions associated with the respective segments.

12. Teaching apparatus according to claim 11, wherein at least one such lesson segment of one such teaching program includes a branch lesson following the question period of such lesson segment in which clues are provided to assist the student in correctly answering questions responded to incorrectly, and the associated said segment data information code group further includes branch flag data indicating the presence of each such branch lesson.

13. Teaching apparatus according to claim 11, wherein each said segment data information code group is arranged to include repetitions of each item of said segment address data and said controller means detects errors in said segment data information code group by comparing said repetitions.

14. Teaching apparatus according to claim 13, wherein said segment data information code group includes a first and a second section, with each section including first and second occurrences of each said item of said segment address data, and said controller means compares the first and the second occurrence of each said item, and if such occurrences have the same value for each item, the data of the first section is stored in said controller means, but if such occurrences have different values, the data of the second section are stored in said controller means.

15. Teaching apparatus according to claim 9, wherein said control signal includes pulses occurring periodically in said control track, and said controller means includes counter means, reset at the onset of each program, to count said pulses to determine the length of advancement of said tape, and comparing means comparing the contents of said counter means with address data contained in said stored control information, and said mode establishing signal is furnished to said video tape device in response to the resulting comparison carried out in said comparing means.

* * * * *